United States Patent [19]
Haessig

[11] Patent Number: 5,005,636
[45] Date of Patent: Apr. 9, 1991

[54] VARIABLE AIR VOLUME VENTILATING SYSTEM AND METHOD OF OPERATING SAME

[75] Inventor: David L. Haessig, Poway, Calif.

[73] Assignee: Staefa Control System, Inc., San Diego, Calif.

[21] Appl. No.: 475,034

[22] Filed: Feb. 5, 1990

Related U.S. Application Data

[63] Continuation-in-part of Ser. No. 150,247, Jan. 29, 1988, Pat. No. 4,942,921.

[51] Int. Cl.⁵ .................................................. F25B 29/00
[52] U.S. Cl. ...................................... 165/16; 98/39.1; 236/49.3
[58] Field of Search .................. 236/49.3, 13; 98/39.1; 165/16

[56] References Cited

U.S. PATENT DOCUMENTS

| | | | |
|---|---|---|---|
| 3,653,589 | 4/1972 | McGrath | 236/49.3 |
| 4,044,947 | 8/1977 | Spethmann | 236/13 |
| 4,182,484 | 1/1980 | Stanke et al. | 236/49.3 X |
| 4,329,926 | 5/1982 | Hall, Jr. | 236/13 |
| 4,657,178 | 4/1987 | Meckler | 236/13 |

Primary Examiner—William E. Wayner
Attorney, Agent, or Firm—Bernard L. Kleinke; Jerry R. Potts; William Patrick Waters

[57] ABSTRACT

A variable air volume ventilating system includes a fan volume modulator, for controlling a series terminal fan. A controller determines the proper fan motor speed, and generates a control signal which is transmitted to the fan modulator for varying the volume of the fan to be at least equal to the volume of the primary air available.

28 Claims, 5 Drawing Sheets

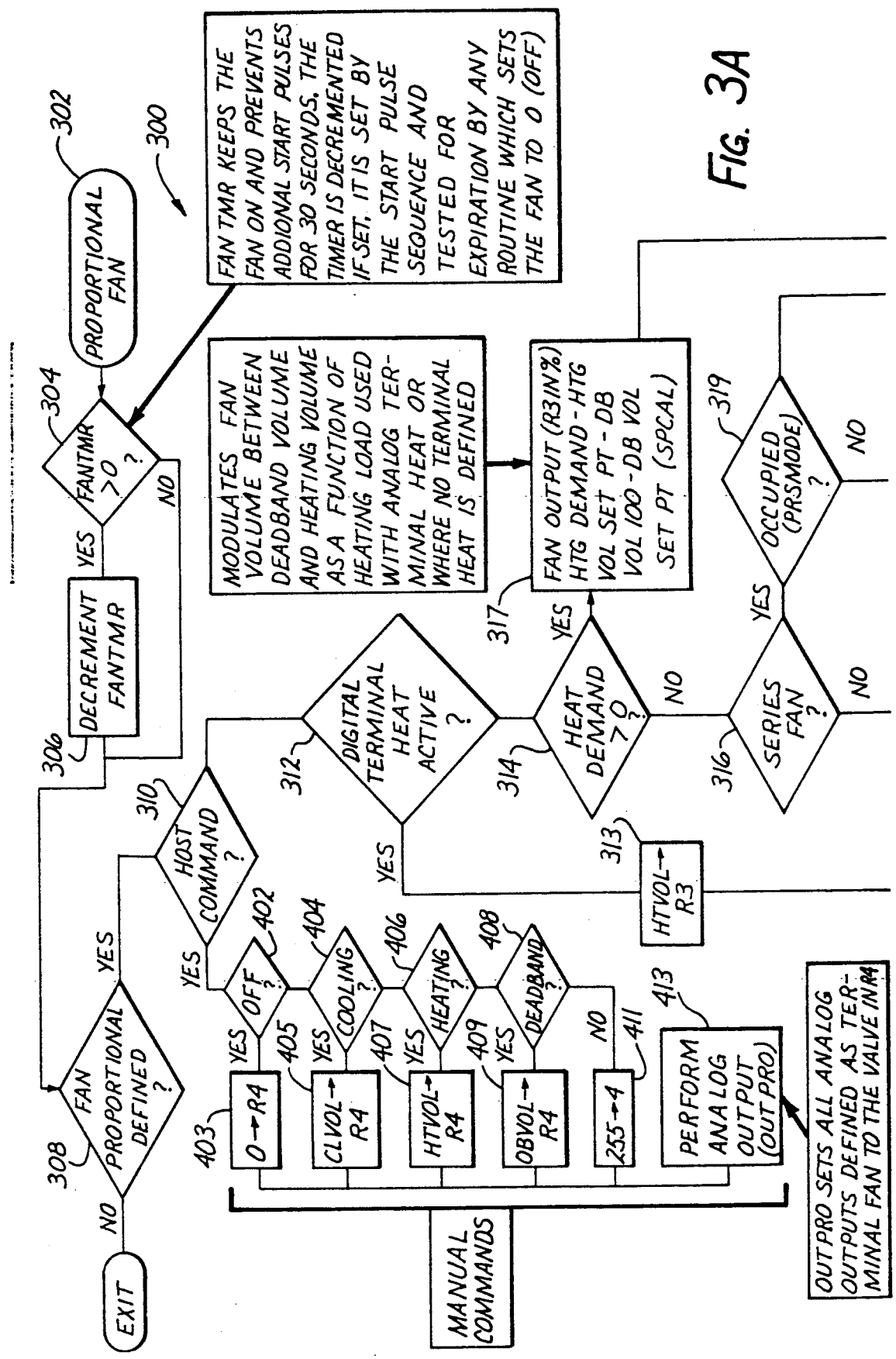

5,005,636

VARIABLE AIR VOLUME VENTILATING SYSTEM AND METHOD OF OPERATING SAME

CROSS-REFERENCE TO RELATED APPLICATION

This is a continuation-in-part of a copending U.S. patent application Ser. No. 07/150,247, now U.S. Pat. No. 4,942,921 filed Jan. 29, 1988, assigned to the same assignee. The above referenced application is incorporated herein fully by reference.

TECHNICAL FIELD

The present invention relates in general to a variable air volume ventilating system, and it more particularly relates to an improved ventilating system, which automatically controls the output volume of an individual variable air fan to provide air flow to a space in a desired manner, at minimized, or at least at greatly reduced, energy consumption and average noise level.

BACKGROUND ART

Variable air volume ventilating systems were developed in response to the energy crisis experienced in the early years of the 1970 decade. While such systems reduced energy usage, they did so at the expense of comfort. For example, to obtain occupant comfort in a defined closed space, cooling air from a variable air volume terminal should be uniformly mixed with the air in the space receiving the air. The mixing requirements for these sources involves the temperature of the primary cooling air, the shape of the defined space, the velocity of the primary cooling airstream, and the diffuser design which disburses the air into the space.

When cooling demand is high in the space, the cooling air velocity from the diffuser must necessarily be high. The pressure of this high velocity air is low, causing it to cling to the ceiling of the space. As the cooling air continues to travel from the diffuser, warm air which has migrated to the ceiling within the space is drawn in and mixed with the cold airstream. The cooling air slows down and moves away from the ceiling. Since the cooling air is now mixed with warm air, the temperature is much closer to the actual room temperature. This air drops toward the bottom of the room in a broad, gentle pattern. The diffuser enables a uniform distribution of temperature and air flow to be maintained in the space.

Conversely, when the cooling load is low, the velocity of the air leaving the diffuser is low. Low velocity air does not cling to the ceiling or draw in warm air. This cold air drops in a column between the diffuser and the floor of the space. This phenomena is called "dumping," and produces a very spotty undesirable temperature and air flow envelope within the space. When the primary air temperature is low, the above described problem becomes exaggerated.

One attempted solution to correct the poor air flow envelope during low cooling loads involves raising the primary cooling air temperature. Such a technique enables a higher volume of air to be delivered to satisfy the small cooling load requirement. Thus, the higher volume of air helps enable a more uniform distribution thereof; thereby aiding occupant comfort. While this technique was acceptable for some applications, it has not proven entirely satisfactory when the primary air is used for humidity control and when the higher primary air temperature is unable to satisfy all the cooling demands (different spaces) within a given building.

Another attempted solution to correct the poor air flow envelope flowing into a space during low cooling loads, has involved using an induction type variable air volume type terminal. Such induction type terminals mix ceiling return air with primary cooling air at an air valve opening in the primary airstream at its point of highest velocity. This mixing raises the temperature of the air leaving the diffuser, but the diffuser velocity is slightly lowered. In this regard, the air drops from the diffuser, because the volume is too low to produce adequate draw to the ceiling of the space. The temperature envelope does drop downwardly from the ceiling, but the air is not as cold. Thus, the air flow pattern, overall, is not entirely satisfactory.

A further attempt at improving the temperature control and air flow distribution, has involved the use of modulating diffusers. With this mechanical device, a high velocity airstream is maintained from the diffuser to produce an air flow pattern, which extends along, and in relatively close proximity to, the ceiling of the space. The distance of path of travel of the air discharged from the diffuser is a function of the air volume. When the cooling load is low, ceiling air is mixed with primary cooling air, but the air flow pattern is reduced.

In order to improve the air flow envelopes and to obtain satisfactory temperatures of the air entering the space, a terminal fan has been utilized to draw air from the ceiling and to mix the return air from the space, with the primary cooling air. The terminal fans either have been mounted in parallel with the primary air discharge, or have been mounted in series with the primary air discharge.

The parallel fan terminals were developed for variable air volume air ventilation systems where humidity control requirements prevented the raising of the primary cooling air temperature. The parallel fan terminals mix return air from a ceiling return, with air from a primary cooling air valve at the outlet of the terminal fan. A parallel terminal fan arrangement of an improved design is shown and described in the foregoing mentioned parent patent application.

Series fan terminals mix return air from the ceiling return, with air from the primary air valve, at the inlet to the terminal fan. The conventional series fan runs continuously to provide an almost constant volume of air to the space. The primary air valve is regulated to provide the required volume of primary cooling air through the series fan to the space. The remaining air delivered by the fan is drawn from the ceiling return. In this regard, the air flow and temperature envelopes are maintained in a relatively constant manner.

While the conventional series terminal fan units have provided relatively constant air flow and temperature envelopes, the series fan had to be sufficiently large in size and capacity, to handle peak cooling loads, because the primary cooling air passes through the series fan. In this regard, the prior known series fan has operated at a peak cooling load at all times, and in this regard, has operated at or near its maximum fan speed. Moreover, since the diffuser also has functioned continuously at or near its peak output, unwanted special sound absorbing and air duct hardware has been required.

In addition to these problems, the series fan terminal has been expensive to operate, because the fan must operate continuously at maximum air volume. These economic factors use up most of the energy consumption savings that justify a variable air volume system. Moreover, the conventional series fan is large in size and capacity, and thus is undesirably noisy to operate. Thus, oversized fans are usually employed, so that they can be operated at a speed, which is substantially less than the maximum speed, for noise reduction purposes However, the larger sized fan is thus still more expensive for the initial installation costs.

In a typical building provided with a series fan variable air volume system, the primary air fan is smaller and less expensive for the building owner to operate. On the other hand, a tenant in the building is typically required to purchase the large series fan terminals for their leased space, and the tenant is required to pay for the energy required to operate the series fans. Thus, when such a prior known system is less expensive for the building owner to purchase and to use, the cost to the tenant to install and to use a series terminal, is relatively and significantly higher than a comparable parallel fan terminal.

Thus, it would be highly desirable to have a series fan system, which employs the desirable smaller sized primary air fan, and yet employ series fan terminals, which are substantially less expensive to install and to use. Also, it would be highly desirable to have such a new and improved variable air volume series fan terminal, which would be relatively inexpensive to operate and install, and which would help to maintain a relatively constant temperature and air flow envelope that would not substantially cause discomfort to the occupants of an air controlled space. Also, such a system should not require or at least greatly reduce the special sound absorbing and air duct hardware required for the system, and should not cause unwanted and undesirable noise problems for the space occupants.

DISCLOSURE OF INVENTION

Therefore, the principal object of the present invention is to provide a new and improved variable air volume ventilation system which is relatively less expensive to install and to use, as compared to comparable prior known system.

Another object of the present invention is to provide such a new and improved variable air volume ventilating system, which minimizes, or at least greatly reduces, energy consumption, and which is less noisy and more comfortable to the occupants of the space, as compared to comparable prior known systems.

Briefly, the above and further objects of the present invention are realized by providing a variable air volume system employing a series fan arrangement, wherein the series fans are modulated when cooling is required. The series fans are controlled by an electronic controller to maintain the series fan speed at a minimum during a dead band temperature range, when neither heating, nor cooling is required. As the temperature increases to a point where cooling is required, the series fan speed increases, so the resulting air volume is equal or greater than the increasing primary air volume.

Thus, the series fan of the inventive system operates at much lower speeds than the conventional series fan, which is maintained at a constant maximum speed. The inventive series fan arrangement are able to employ substantially smaller series fans. Thus, the initial installation costs are less, and the noise levels are much more tolerable. All of this is accomplished, while still being able to employe a small size primary air fan.

During heating, heating elements are employed, and the series fan speed can be increased to a desired level, especially when the system is operated in cold climates. Seasonal adjustments between cooling and heating can be controlled. For example, the increased series fan speed during heating, may not be desirable for some climates, and the series fan can be maintained at the dead band minimum, even during the heating season.

The inventive ventilating system generally includes a series fan volume modulator, which controls the speed of the terminal series fan. The electronic controller determines the desired fan motor speed, and generates a control signal which is transmitted to the fan volume modulator for varying, in turn, the speed of the series fan.

The digital controller contains the necessary firmware to control the modulator, so that the controller can be used for either parallel or series variable air volume fan terminals. For seasonal adjustment purposes, the controller enables the adjustment of a deadband series fan volume, a cooling fan volume and a heating fan volume, as desired.

Maximum cooling fan volume is reached when the cooling load approaches 100%. This point is selected to provide maximum air volume from the primary cooling air duct when the primary air duct valve is opened, and maximum primary cooling air is available to the space.

The deadband fan volume is set to provide the minimum air velocity required when the primary air duct valve is set to a minimum cooling volume. The heating volume is set to provide desired discharge air volume when the spaced calls for heating.

The digital fan volume modulator and controller enables complete balancing of the variable air volume fan terminal, including fan volume, without requiring personnel to enter the ceiling and make adjustments. In this regard, a person simply connects a digital service tool or computer, to the system, such as to a room sensor device. Controls are provided to drive the primary cooling air valve and control the fan as needed to affect balancing. The controller is easily calibrated by the service tool or computer using an auto-calibrate function.

The terminal fan volume control unit provides the desired zone or space comfort, while maintaining the economy of the variable air volume system. Balancing from the room sensor, accurate temperature control and three modes of operation insure comfort when the space is occupied and energy savings at all times.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 3A, 3B and 3C, when arranged in a column, is a flow diagram illustrating the steps executed by the microprocessor of FIG. 1, to control the system thereof.

BEST MODE FOR CARRYING OUT THE INVENTION

Figure 1:
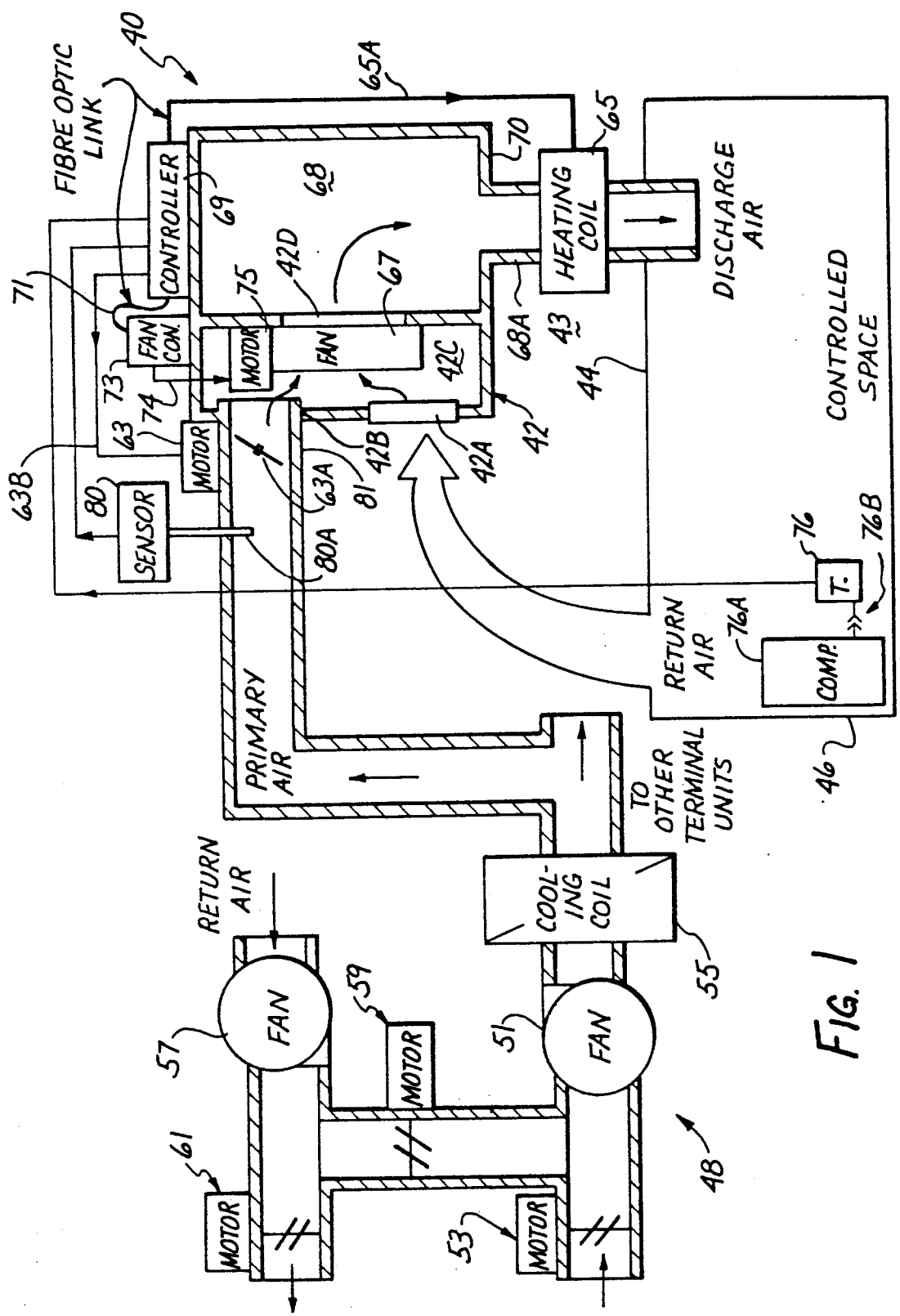
FIG. 1 is a symbolic block diagram of a variable air volume series fan terminal system, which is constructed in accordance with the present invention.

Referring now to FIG. 1, there is shown a ventilating system 40, which is constructed in accordance with the present invention. The system 40 includes a variable air volume terminal unit 42, which is mounted in a plenum space 43 above a ceiling 44 of a controlled space 46. A primary air system 48 supplies cold air through the terminal unit 42 to the controlled space 46.

The primary air system 48 includes a primary air fan 51 which draws air from a mixed air plenum or duct through a motor-driven damper arrangement 53 and 59, and which discharges it through a cooling coil 55 to supply cool primary air to the terminals, such as the terminal 42. Thus, the cooled primary air flows into the series connected terminal units, such as unit 42 for each space, such as the space 46. The other terminal units are not shown, but are similar to unit 42.

A return air fan 57 draws air returned from the spaces being conditioned, and discharges it through a motor driven damper 59 and into the inlet of the fan 51 for mixing with outside air entering therein. Also, a motor driven damper 61 discharges return air from the discharge of fan 57, to the outside environment.

The terminal unit 42 includes a motor driven damper 63 for admitting the primary air under pressure into an inlet of a series connected terminal fan 67. The terminal fan 67 draws both the primary air under pressure via na inlet 42B, and air returned from the space 46 via an inlet 42A. A chamber 42C of the terminal 42 houses the fan 67, and includes the inlets 42A and 42B. The series fan 67 discharges air via an outlet 42D of the chamber 42C, into the interior of an adjacent chamber 68 of the terminal unit 42, and from there, the air flows out of an outlet 68A of the chamber 68, through a heating coil 65 and into the space 46. The heating coil is optional, and thus, may be omitted, if desired.

The return air drawn from the space 46 can either be from the interior of the plenum above the ceiling 44, or it can be guided by a duct (not shown). The discharge of the fan 67 is directed into the chamber 68 within the terminal 42 for causing the flow of primary air and return air to enter the controlled space 46 via the heating coil 65. Thus, the cold primary air is mixed by the fan 67 with the returned air from the space 46, and the mixed air is heated, if required, by the heating coil 65, prior to being discharged into the space 46.

It should be understood that the primary air system 48 supplies a variable volume of cooled air which is distributed to each of the terminal units, such as terminal unit 42, the volume of air available to each of the terminal units is a variable quantity depending on the demand requirements of each of the terminal units.

A controller 69 is mounted on the outside of a housing 70 of the terminal unit 42, which in turn is disposed in relatively close proximity to the space 46. The controller 69 monitors continuously a set of variable conditions of the air in the space 46, the volume of primary air available to the terminal unit 42, and the condition of the air in the space 46. The controller 69 generates a continuously varying control signal indicative of a desired quantity of cooled primary air under pressure required for mixing with the return air from the controlled space 46 in mixing chamber 68 for the purpose of conditioning the air in the space 46 to a desired temperature. A fiber optic link or light conduit 71 is interconnected between the controller 69 and a fan control unit 73, for supplying the control signal thereto.

The fan control 73 is also mounted on the outside of the housing 70 of the terminal 42 above the fan 67 mounted on the inside of the housing 70 within the chamber 42C. The fan control 73 responds to the control signal received from the controller 69, via the fiber optic link 71, to cause the motor device in the form of the fan 67, to vary continuously the flow rate of the air entering the mixing chamber 68 during cooling, for conditioning the air being discharged into the space 46.

As hereinafter described in greater detail, the controller 69 causes a control signal to vary in a proportional manner relative to the volume of primary air available to the terminal unit for conditioning the air being discharged into the space 46. The fan control 73 responds to the control signal received via the fiber optic link 71 to provide a high voltage continuously during the pulse modulated signal via a lead 74 to a motor 75 driving the fan 67 continuously in a manner as described in more detail, the connection with the description of FIG. 2.

The controller 69 generates the control signal sent via the fiber optic link 71 to the fan control 73, in response to a set of variables. In this regard, a temperature sensor 76 disposed within the space 46 provides a signal to the controller 69, which signal is indicative of the temperature of the air within the space 46. The sensor 76 is also used for setting a desired temperature for the space 46. Additionally, a service device, such as a computer 76A located within the space 46, or by means of a suitable service tool (not shown), can be connected electrically via a jack 76B to the temperature sensor 76, sending information to the controller 69, via the sensor 76, to set minimum and maximum flow rates for the terminal unit 42. It should be understood that different adjustments can be made, under the control of the computer 76A, which can be located outside of the space 76 and can be connected directly to the controller 69.

An air flow sensor 80 having an element 80A in a duct 81 conveying the cooled primary air under pressure into the terminal unit 42 provides a signal to the controller 69, which signal is indicative of the volume of cooled primary air available for drawing into the terminal unit 42. The temperature of the primary air may typically be 55 degrees Fahrenheit, and it mixes in the mixing chamber 68 with the return air from the return air space 46 at, for example, a higher temperature.

An electric damper motor 63 for the main air valve or damper 63A is controlled by a response to a signal received via the lead 63B from the controller 69. As hereinafter described in greater detail, the signal for driving the motor 63 depends on the other conditions being monitored by the controller 69.

A fiber optic link or light conduit 65A conveys a continuous signal from the controller 69 to the heating element 65. Thus, the element 65 is driven by the signal to modulate the amount of heating of the air being discharged into the space 46.

The fan control 73 varies the output volume of the terminal fan 67 to eliminate the discomfort associated with the prior art series fan terminal and economically provides the benefit of the series fan terminal. When the space temperature is above the setting of the controls, the primary air valve 63A is modulated towards the maximum position to provide additional cooling to the space.

As the space temperature begins to decrease, the primary air valve or damper 63A is modulated toward the minimum position reducing the amount of cooling to the space 46.

Figure 2:
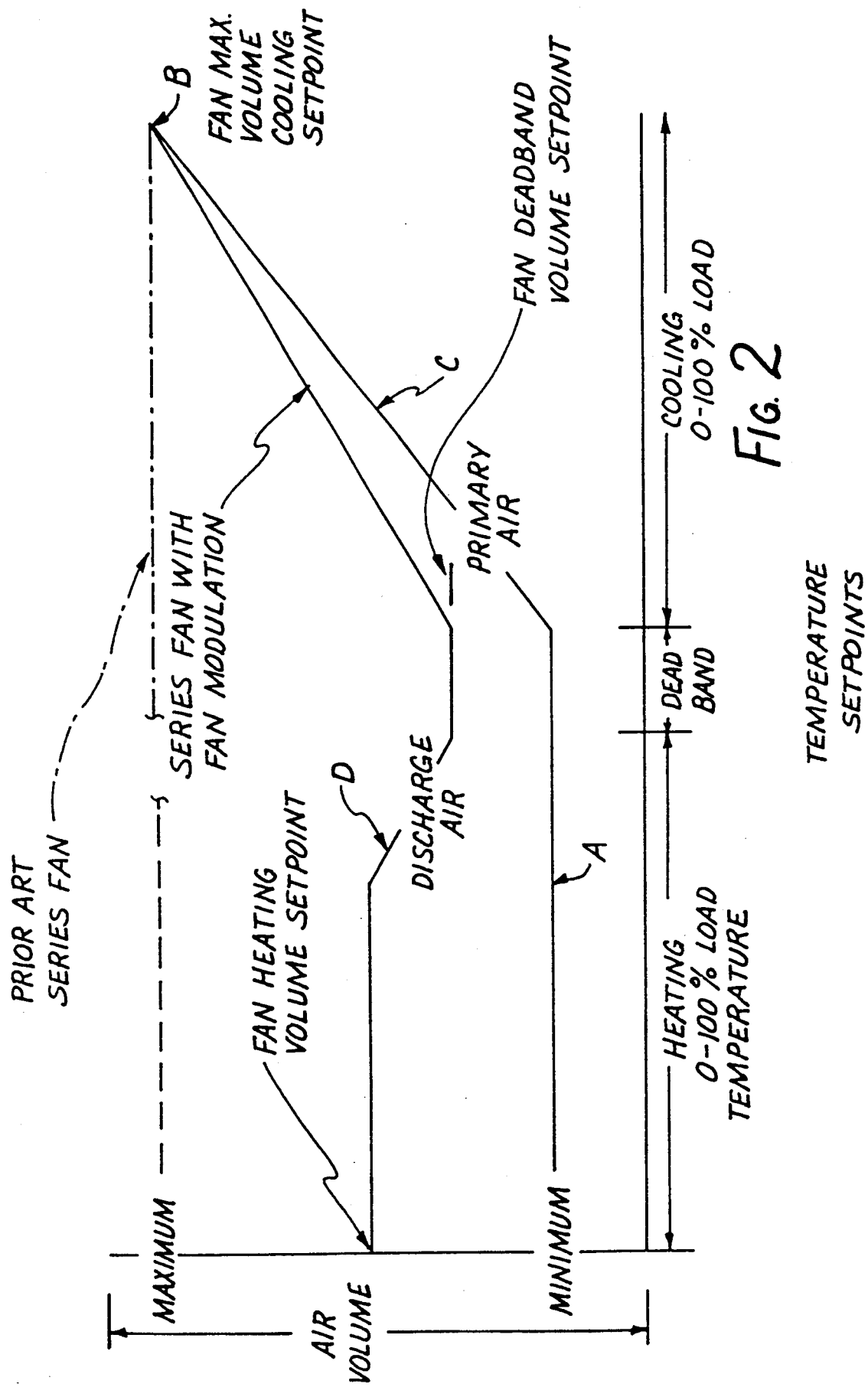
FIG. 2 is a graph of fan speed of the system of FIG. 1, illustrating a comparison with prior art series fans.

The motor 63 via the controller 69 modulates the cooled primary air available for mixing with the returned air from the space 46. The fan control 71 continuously varies the fan speed of fan 67 so that the output volume of the fan 67 at least exceeds continuously the volume of cooled primary air required for conditioning the air in the space 46 to a given temperature setting. This feature provides the air movement comfort of the conventional parallel fan terminal unit, without the objectionable occupant discomfort caused by abrupt changes in air volume and sound level when the fan starts and stops periodically. Moreover, substantial energy savings over conventional series fan terminals are realized, because the fan 67 does not require a constant peak or maximum output volume. As shown in FIG. 2, the speed of the series fan 67 is substantially far less than the speed of the prior art series fan, which is constantly driven at a maximum speed.

The controller 69 and the fan control 73, as well as the other sensors and devices are similar to those disclosed in the foregoing mentioned parent patent application.

The fan control 73 is preferably a phase cut motor speed/resistive modulator element. Conventional connection of the control signal between a controller and a phase cut modulator heating element, such as a conventional heating element 65, is hereby used by a two wire connection (not shown). The two wire connection requires two wire terminations at each end, is prone to wiring errors, and may transmit electromagnetic interference (EMI).

The fiber optic connections for both the fan control 73 and the heating element 65, require only one termination at each end, are not prone to wiring errors, and do not transmit EMI noise signals, which can cause malfunctions.

Conventional phase cut modulator elements applied to motor speed control, require the power sending to be high enough to start the motor turning from a dead stop. This limits the minimum speed to 50% or greater with many motor types. The controller 69 overcomes the start up hysteresis of the motor by providing a full start pulse to the motor before backing down to the calculated speed. This feature allows the motor speed to be set lower than that required by the motor start power.

The ideal phase cut modulator element varies the power to a load as a linear function of the input or control signal. The power is regulated by switching the power on during a portion of each cycle of alternating current power source. Full power supplied to the load when the power is switched on at the beginning of each half cycle and off at the end of each half cycle. Partial power is supplied to the load, by holding power off for a period of time beginning at the start of each half cycle.

Conventional phase cut modulator elements nearly vary the pulse with the function of the control signal to develop the output power. This method of modulation creates linearity distortion, because the pulse amplitude, as well as the width varies. The following table demonstrates this distortion:

| INPUT SIGNAL | NORMAL OUTPUT | IDEAL OUTPUT |
| --- | --- | --- |
| 0%, 10%, 20%, 30%, 40%, 50%, 60%, 70%, 80%, 90%, 100% | 00.00%, 00.645%, 04.863%, 14.86%, 30.65% 50.00% 69.35%, 85.14%, 98.14%, 99.35% 100% | 00%, 10%, 20%, 30%, 40%, 50%, 60%, 70%, 80%, 90%, 100% |

The controller 69 controls this linearity problem by adjusting the pulse width to compensate for the changing the pulse amplitude. The result is a modulator element which controls the output power closer to the power called for by the control signal.

This feature allows more accurate control of the motor speed of fan motor 75 and the resistive heating element 65. This starting pulse feature, and the minimum and maximum set point features, enable phase and modulation of the fan and other motor speed to be applied to a broader range of motor types and applications. This feature enables the system 40 to perform satisfactorily to replace high cost variable frequency drives in many applications.

The controller 69 provides the ability to set a minimum and maximum fan volume set point using remote communications ability designed into the controller 69. Conventional adjustment of the VAV fan requires access to the fan speed control (not shown) which is usually mounted in the ceiling next to the fan.

Controller 69 allows the fan 67 to be adjusted remotely using the computer 76A connected to the room temperature sensor 76. This feature saves installation and maintenance time, because time consuming ceiling entry is not required for fan adjustment.

Conventional controls allows fresh air from the primary duct to be introduced into the space at all times. Fresh air is required when the space is occupied to provide comfort as defined by local building codes. When the space is not occupied, conventional controls continue to provide the space with fresh air by maintaining the minimum primary air volume.

Controller 69 can be remotely controlled or remotely commanded to one of three occupancy sequences: occupied, standby, and unoccupied. When performing the occupied sequence, the controller 69 controls the space 46 to occupied set points and provides fresh air by maintaining a minimum primary air volume.

When performing the standby sequence, the controller 69 controls the space to occupied set points keeping the space ready for immediate occupancy. Since the space is not occupied, fresh air is not needed. The minimum primary air volume is set to zero.

When performing the unoccupied sequence, the controller 69 controls the space to temperatures set to protect the structure and the contents during long (overnight) periods upon occupancy. Since the space is not occupied, fresh air is not needed. The minimum primary air volume is set to zero.

Setting the minimum primary air volume to zero during the periods of unoccupancy saves fan and thermal energy. When the space 46 is not occupied, the cold air supplied for minimum fresh air requires fan energy supply and may over cool the space requiring heating of the air being discharged in space.

Controller 69 allows the user to correct minor errors in input sensor readings caused by wire resistance and offsets in the sensors. Auto-calibrate applies, but is not limited in temperature and air volume readings.

Conventional VAV controller requires air balance personnel to measure air volume for each required setting. These settings typically include: minimum primary air volume, maximum primary air volume, heating primary air volume, fan primary air volume, and then, fan volume.

The controller 69 enables the air balance personnel, to enter the measured value at one point and the air value between half and full open. Personnel simply calibrate the controller 69 to the measured reading, using the computer 76A. The required set points are then entered into the controller 69 using the service tool.

The air balance personnel does not have to make a measurement at each setting since the processing power of the controller 69 serves to calculate the appropriate curve in the engineering unit for the calibration point and the air volume sensor type. The result is a greatly reduced setup time for air balancing in a building, and greater air balance accuracy is achieved.

Conventional VAV controls position the primary air volume from minimum primary air volume to heating primary air volume whenever heat is called. If the source puts a constant amount of heat, the heating primary air volume is selected to provide the air velocity required to supply the resulting temperature of the heating air into the space.

When the source puts out a variable amount of heat (proportional control), the heating primary volume is selected to provide the air velocity required to supply the resulting temperature of heating air into the space being heated when the temperature source is at partial (80%) of capacity. When the heating source is below the desired point, the discharge air temperature is lower; therefore, the higher air volume is not required. This higher air volume wastes fan energy, cooling energy, and heating energy. Many times space humidity is driven down to a level where space humidification is required. When the heating source is above the desired point, the air velocity may be too low to provide satisfactory dispersion of the heating air into the space.

The controller 69 applies a unique process to control proportional heat with a non-fan type VAV terminals. Before the controller enters heating, the primary air volume is at minimum position. A heating primary air volume set point is also set in the controller. This setting is the volume of primary air required to develop the velocity required to distribute the heated air when the heating source is at 100%.

As the temperature decreases, the controller 69 proportions the heat being applied. As the heating supply is turned on, the primary air volume is proportionately controlled between the minimum primary air volume and the heating primary air volume. For example, if the heating source is at 25%, the primary air volume is at M+25% (H−M) where H equals the heating primary air volume and M equals the minimum primary air volume.

This process presents the occupants from being "shocked" with cold air when the heating source is providing less heating energy than the cooling energy being supplied by heating primary air volume. That energy is not wasted by providing more velocity that is required to mix the heating air into the space. Thermal energy, both cooling and heating, are saved and dehumidification of the air is reduced.

Referring now to FIG. 2, there is shown a graph of the operation of the system 40. The operation of the primary air damper 63 is characteristically as it is moved under the control of the controller 69 from a closed position at minimum cubic feet per minute flow rate, to a maximum opened cubic feet per minute flow rate. It should be noted as the temperature varies between warm and cold conditions in the space 46 of FIG. 1, the primary air control damper 63 moves from a fully closed position at A, to a fully opened position at B. A linear transition occurs at C.

Prior to the transition of C, the heating coil 65 is "energized," the fan 67 is constantly activated at its minimum rate of speed, and the primary air valve 63 is fully closed, thus providing maximum heating. As the heating requirement for space 46 decreases the speed of fan 67 remains fixed at its minimum rate of speed, the primary air valve 63 remains fully closed, and the heating coil 65 is deactivated, traversing between a high position to a low position through a linear transaction at D, during the heating cycle.

As the heating requirements are terminated, the heating coil 65 remains "de-energized," the primary air valve 63 remains fully closed, and the speed of fan 67 is increased to provide maximum cooling without mixing primary air with air returned from the space 46. This is called the DEADBAND cycle and ensures that the volume of air drawn by fan 67 will always exceed the maximum volume of cooled primary air available to the terminal unit 42.

As the temperature within the space 44 increases, the air damper position of air valve 63 is controlled linearly at C relative to the linear control of the fan 67, and the maximum volume of cooled primary air available to the terminal unit 42 for conditioning the air in space 46 to a desired temperature. Therefore, it should be noted that the speed of fan 67 varies between a maximum and minimum value and operates at all times at a speed that draws an air volume exceeding the maximum volume of available cooled primary air so that cooled primary air and returned air may be drawn into chamber 42C.

The phantom line showing of the modulated constant speed of a prior art series fan (not shown) illustrates the high operational speed thereof, as compared to the fan 67. Thus, the conventional series fan requires substantially more energy to operate.

CONTROLLER FIRMWARE

Figure 3B:
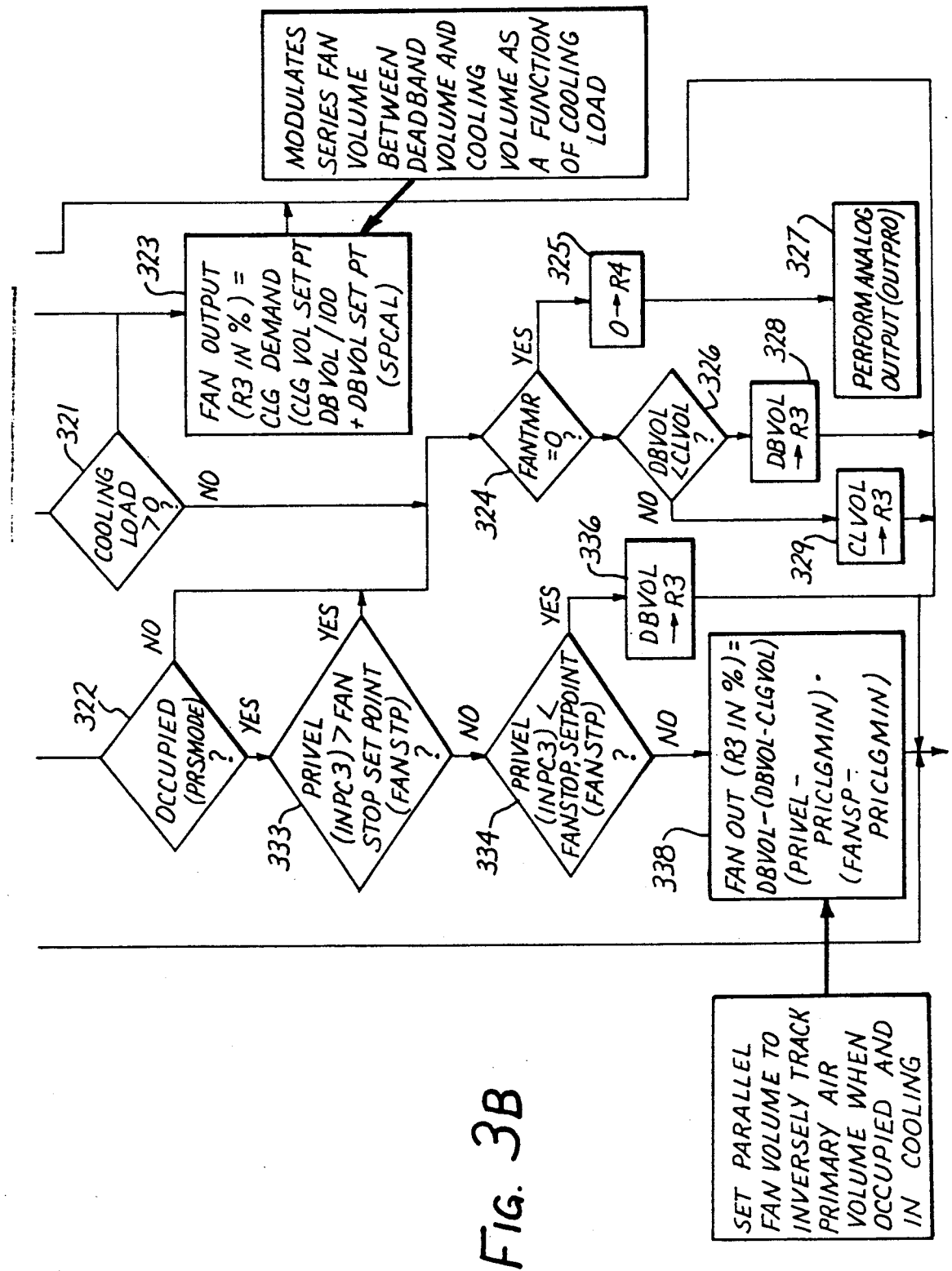
Figure 3C:
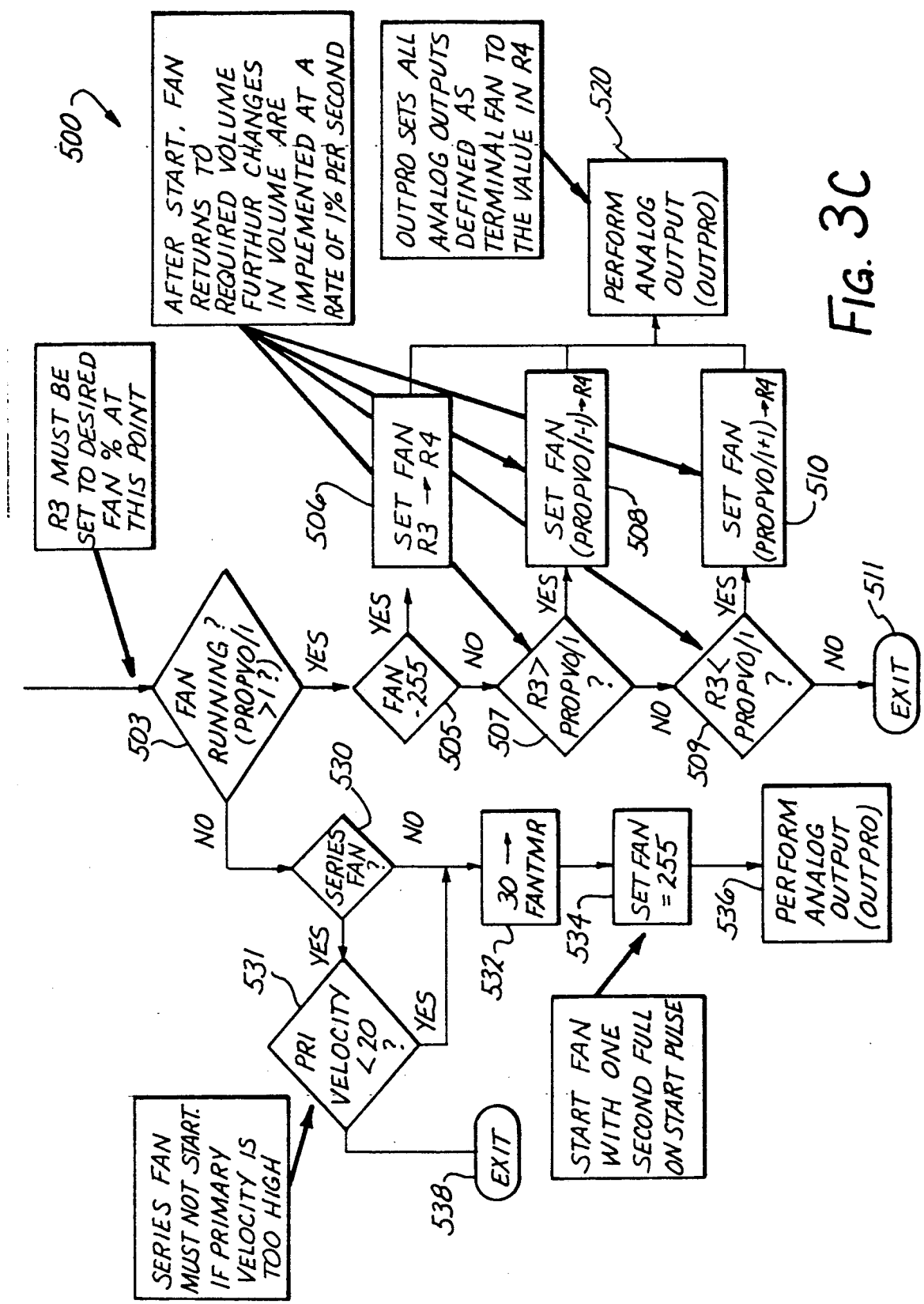

Referring now to FIGS. 3A, 3B and 3C, the firmware of the controller 69 will now be described. The terminal unit 42 modulates the cooled primary air available for mixing with the returned air from the space 46 and continuously varies the fan speed of fan 67 during cooling requirements so that the output volume of fan 67 always exceeds the volume of cooled primary air required for conditioning the air in space 46 to a given temperature setting. The firmware of controller 69 allows the fan 67 to be locally controlled or remotely commanded to one of three occupancy sequences: occupied, standby and unoccupied. The following will describe the occupied sequences Referring now to FIGS. 3A, 3B and 3C, a flow chart diagram is shown, illustrating the steps taken by the controller 69 of FIG. 1 in determining the appropriate operating condition; and in controlling the conditioning of air in space 46 of FIG. 1. Starting in a START instruction 302 which is initiated by a second timer (not shown), the PROPORTIONAL FAN program proceeds to a decision instruction 304 which determines whether the fan timer (FANTMR) is greater than zero or set. If it is determined in the decision instruction 304 that the fan timer is set, the program next executes an instruction 306 that decrements the fan timer (FANTMR). In this regard, the fan timer (FANTMR) keeps the proportional fan 67 on and prevents additional start pulses for a period of thirty (30) seconds. The fan timer (FANTMR) is set by a FAN OUTPUT subroutine 500 that will be described hereinafter in greater detail. The status of the fan timer (FANTMR) is tested for expiration by any subroutine which causes the fan 67 to be turned off or reset to zero.

After decrementing the fan timer (FANTMR), the program next proceeds to a decision instruction 308 which determines whether a proportional fan is defined for the terminal unit, such as terminal unit 42. If not, the program exits to a standby state (not shown). If the fan timer (FANTMR) was not set at decision instruction 304 the program proceeds directly to decision instruction 308 as described above.

If it is determined in the decision instruction 308 that a proportional fan has been defined, the program next executes a decision instruction 310 that determines whether a host command is present to change the mode of operation for the variable volume fan terminal 42.

In this regard, the controller 69 has six separate commands for controlling the various operating states of the terminal unit 42. A list of the commands is provided in Table I, each of which will be described hereinafter in great detail.

TABLE I

| JB0 | Set Fan on Velocity Setpoint |
| JB1 | Set Fan Output Speed to Maximum Volume |
| JB2 | Set Fan Off Immediately |
| JB3 | Set Fan Output Speed to Deadband Volume |
| JB4 | Set Fan Output Speed to Cooling Volume |
| JB5 | Set Fan Output Speed to Heating Volume |

If it is determined in the decision instruction 310 that a host command is present, the program proceeds to a decision instruction 402 to determine whether the command was to Set Fan Off immediately, i.e., cmd=JB2.

If it is determined in the decision instruction 310 that a host command is not present, the program proceeds to a run automatic sequence by advancing to a decision instruction 312 to determine whether the terminal heat unit 65 is active (THFTMR equal to a logical 1). If the terminal heat unit 65 is active, an output volume from fan 67 is required. In this regard, the program next executes an instruction 313 that sets the fan speed of fan 67 to its heating output volume (HTGVOL) or its minimum flow rate. After setting the fan output volume to the heating output volume (HTGVOL), the program proceeds to the FAN OUTPUT subroutine 500.

If it is determined at decision instruction 312 that the terminal heat unit 65 is not active, the program proceeds to decision instruction 314 to determine whether the heating demand of the terminal unit 42 is greater than zero (HTG DEMAND>0). If it is determined that the heat demand (HTG DEMAND) is greater than zero, the program advances to instruction 317 which sets the fan speed of fan 67 to modulate according to the following formula:

If: HTG DEMAND > 0
Then:
FAN OUTPUT VOL. (REG. $R3$ IN %) =

-continued
HTG DEMAND − HTG VOL. SETPOINT −
DEADBAND VOL/100 +
DEADBAND VOLUME SETPOINT The above referenced formula causes the fan output volume of fan 67 to modulate between a deadband volume output and a heating volume output as a function of heating load used with analog terminal heat, or where no terminal heat is defined.

After setting the fan output volume to vary according to the above-stated formula, the program next proceeds to the FAN OUTPUT subroutine 500.

If it is determined at decision instruction 314 that the heat demand (HTG DEMAND) of the terminal unit 42 is not greater than zero the program next executes a decision instruction 316 to determine whether the fan on setpoint (FANSTP) is greater than the maximum primary air velocity (PHMAX) as required for series fan operation.

If it is determined in decision instruction 316 that the fan on setpoint (FANSTP) is greater than the maximum primary air velocity (PHMAX) the program proceeds to decision instruction 319 to determine whether the terminal unit 42 is in the occupied mode (PRSMODE). If the terminal unit is not in the occupied mode the program next executes decision instruction 321 to determine whether the cooling load is greater than zero (CLG>0).

If it is determined in decision instruction 319 that the terminal unit 42 is in the occupied mode the program proceeds to command instruction 323 that causes the output volume of fan 67 to modulate between the deadband volume and the cooling volume as a function of the cooling load. In this regard, the output volume of fan 67 is expressed by the following formula:

Fan Output Volume = (Cooling Demand)

$$\frac{\text{Cooling Volume Setpoint} - \text{Deadband Volume}}{100} +$$

Deadband Volume Setpoint

After the output volume of the fan 67 has been adjusted to modulate between the deadband volume and the cooling volume as a function of the cooling load, the program proceeds to the FAN OUTPUT subroutine 500.

In decision instruction 321, if it is determined that the cooling load (CLG) is greater than zero the program proceeds to command instruction 323 and adjusts the output volume of fan 67 as described above with reference to instruction 323. If it is determined that the cooling load is zero the program next executes decision instruction 324 to determine whether the fan timer (FANTMR) equals zero.

The program advances to command instruction 325 if the fan timer (FANTMR) equals zero and stores a zero value in a R4 register (not shown). The program next executes command instruction 327 that sets the analog fan output to 0% turning fan 67 off. The program then exits to the standby state (not shown).

If the fan timer (FANTMR) does not equal zero in decision instruction 324 the program advances to decision instruction 326 which determines whether the deadband volume (DBVOL) equals the cooling volume (CLVOL). If the deadband volume equals the cooling volume, the program next executes command instruction 328 which sets the analog output of fan 67 to the deadband volume (DBSET) by storing the deadband volume value in a R3 register (not shown).

In decision instruction 326, the program advances to command instruction 329 if the deadband volume (DBVOL) does not equal the cooling volume (CLVOL), command instruction 329 sets the analog output of fan 67 to the cooling volume by storing the cooling volume value in the R3 register.

After the program has set the analog output of fan 67 to either the deadband volume (DBVOL) in instruction 327 or the cooling volume (CLVOL) in instruction 329 the program proceeds to the FAN OUTPUT subroutine 500.

Referring again to decision instruction 316, if it is determined that the fan on setpoint (FANSTP) is not greater than the maximum primary velocity of the primary air (PHMAX) the program proceeds to decision instruction 322 which determines whether the terminal unit 42 is in the occupied mode (PRSMODE). If the terminal unit 42 is not in the occupied mode, the program advances to decision instruction 324 and proceeds as previously described.

If it is determined that the terminal unit 42 is on the occupied mode (PRSMODE) the program next executes decision instruction 333 which determines whether the air velocity of the primary air is greater than the fan start setpoint (FANSTP). If the primary air velocity is greater than the fan start setpoint, the output volume of fan must be adjusted. In this event, the program advances to decision instruction 324 and proceeds as previously described.

If the velocity of the primary air is not greater than the fan stop setpoint in decision instruction 333, the program advances to decision instruction 334 which determines whether the velocity of the primary air is less than the fan stop setpoint. If the primary air velocity is not less than the fan start setpoint, the program next executes command instruction 338 which causes the output volume of fan 67 to inversely track the primary air volume when the space is occupied and cooling is required. In this regard, the output volume of fan 67 is expressed by the following formula:

$$\text{Fan Output Volume} = \text{Deadband Volume} - (\text{Deadband Volume} - \text{Cooling Load Volume})(X) - \text{Primary Cooling Minimum}$$

$$\text{where } X = \frac{\text{Primary Velocity} - \text{Primary Cooling Minimum}}{\text{Fan Start Velocity}}$$

After the output volume of the fan 67 has been adjusted by command instruction 338 the program proceeds to the FAN OUTPUT subroutine 500.

If it is determined in decision instruction 334 that the velocity of the primary air is not less than the fan stop set point the program advances to command instruction 336 which sets the analog output of the fan 67 to the deadband volume by storing the deadband volume value in the R3 register. After storing this value, the program advances to the FAN OUTPUT subroutine 500.

Referring to decision instruction 402 in FIG. 3A, if it is determined that the command was to set the fan 67 off immediately the program next executes command instruction 403 which causes a zero value to be stored in a register R4 (not shown). After setting the R4 register to zero the program next executes command instruction 413 that set the analog fan output to the value stored in register R4; i.e. the analog fan output to 0% turning the fan 67 off. The program then advances to the standby state (not shown).

If the command at decision instruction 402 was not to set the fan 67 off immediately, the program next executes decision instruction 404 to determine whether the command is to set the output volume of fan 67 to its maximum cooling output volume (cmd=JB1). If the command is to set the output volume of the fan 67 to its maximum cooling output volume, the program next executes command instruction 405 which causes the maximum cooling load value to be stored in register R4. After setting the register R4 to the maximum cooling load value, the program next executes command instruction 413 that sets the analog fan output to the value stored in register R4. The program then returns to the standby state.

If the command at decision instruction 404 was not to set the output volume of the fan 67 to its maximum cooling output volume, the program next executes decision instruction 406 to determine whether the command is to set the fan speed to the heating set point (cmd=JB5). If the command is to set the output volume of the fan 67 to the heating set point, the program next executes command instruction 407 which causes the heating setpoint value to be stored in register R4. After setting the register R4 to the heating setpoint value (HTVOL) the program next executes command instruction 413 that sets the analog fan output to the value stored in register R4. The program then returns to the standby state.

If the command at decision instruction 406 was not to set the output volume of the fan 67 to the heating setpoint value, the program next executes decision instruction 408 to determine whether the command is to set the fan output volume to the deadband volume value (cmd=JB3). If the command is to set the output volume of the fan 67 to its deadband output volume, the program next executes command instruction 409 which causes the deadband volume value to be stored in register R4. After setting the register R4 to the deadband volume value, the program next executes command instruction 413 that sets the analog of an output to the value stored in register R4. The program then and proceeds as previously described.

If the command at decision instruction 408 was not to set the output volume of the fan 67 to the deadband volume, the program next executes the command instruction 411 which sets the output volume of the fan 67 to its maximum value with no linearization; i.e., R4=255. After setting the R4 register to 255 the program next executes command instruction 413 that sets the analog fan output to the value stored in register R4. The program then returns the terminal unit to the standby state.

Considering now the FAN OUTPUT subroutine 500 in greater detail with reference to FIG. 10, the FAN OUTPUT subroutine 500 is entered at a decision instruction 503 to determine whether the terminal fan is running (PROPVO/1).

If the terminal fan 67 is running in decision instruction 503, the program proceeds to decision instruction 505 to determine whether the output volume of the terminal fan has been set to its maximum value with no linearization; i.e., R4=255. If the output volume of the terminal fan has been set to its maximum value with no linearization, the program proceeds to command instruction 506 that sets the fan output volume value in register R3 into register R4. After the output volume value in register R3 has been transferred to register R4, the program next executes command instruction 520 that set to analog fan output to the value stored in register R4. The program then returns the program to standby state.

If the output volume of the terminal fan has not been set to its maximum value with no linearization, the program proceeds from decision instruction 505 to decision instruction 507 to determine whether the terminal fan output volume in register R3 is greater than the current running fan output volume (R3>PROPVO/1). If the terminal fan output volume is greater, the program proceeds to command instruction 508 that causes the fan output volume to be decreased by 1% by storing the new fan output volume value in register R4. After the new fan output volume value (PROPVO/1−1) has been stored in register R4, the program proceeds to command instruction 520 that sets the analog fan output to the value stored in register R4. The program then proceeds as previously described.

If the output volume value of the terminal fan stored in register R3 is not greater than the value of the current running fan output volume value (PROPVO/1) the program next executes decision instruction 509 to determine whether the output volume value of the terminal fan stored in register R3 is less than the value of the current running fan output volume value (R3<PROPVO/1). If the value is less than the current running fan output volume value the program proceeds to command instruction 510 that causes the terminal fan output volume to be increased by 1% by storing the new fan output volume value (PROPVO/1+1) in register R4. After the new fan output volume value has been stored in register R4, the program proceeds to command instruction 520 that sets the analog fan output to the value stored in register R4. The program then proceeds as previously described.

If the output volume value of the terminal fan stored in register R3 is not less than the value of the current running fan output volume value (PROPVO/1) no change is required in the output volume of the fan so the program advances to instruction 511 which returns the program to the standby state.

Referring again to decision instruction 503 in FIG. 3C if the terminal fan is not running, the program proceeds to decision instruction 530 to determine whether the fan on setpoint (FANSTP) is greater than the maximum primary air velocity (PHMAX) as required for series fan operation.

If it is determined in decision instruction 530 that the fan on setpoint (FANSTP) is greater than the maximum primary air velocity (PHMAX) the program proceeds to decision instruction 531 to determine whether the primary air velocity is less than a predetermined set value of 20 which is indicative of a fan volume output rate of 500 cubic feet per minute. In this regard, the series fan must not be started if the primary cooling air velocity is too high.

If the primary cooling air velocity is not less than the predetermined value of 20, the program goes to instruction 533 that returns the program to the standby state. If the primary cooling air velocity is less than the predetermined value of 20, the program advances to command instruction 532 that sets the fan delay timer to 30 seconds (FANTMR=30). After setting the fan delay timer to 30 seconds, the program proceeds to command instruction 534 that sets the fan start sequence flag to 255 in order to start the terminal fan with a one second full on start pulse. After setting the fan start sequence flag to 255 the program proceeds to command instruction 536 that performs the analog fan output by causing a one second full on start pulse to be generated. The program then returns the subroutine 300 as previously described.

While a particular embodiment of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A variable air volume ventilating system comprising:
    motive means for supplying a given volume of air mixture to a space to condition the air therein to an approximate predetermined temperature;
    terminal housing means for permitting a desired quantity of primary air to be mingled with a certain quantity of return air from said space to form an air mixture for conditioning the air in said space;
    said terminal housing means including a hollow interior having inlet means and outlet means, said inlet means and said outlet means being in atmospheric communication with said space;
    damper means in atmospheric communication with said inlet means for supplying a desired quantity of primary air to the interior of said terminal means;
    said motive means including a fan, said fan being disposed between said inlet means and said outlet means for drawing said desired quantity of primary air into the interior of said terminal means via said inlet means and for discharging a given volume of air mixture from said interior via said outlet means into said space;
    said fan further drawing said certain quantity of return air into the interior of said terminal means via said inlet means for facilitating the mingling of said return air with said desired quantity of primary air;
    modulator means coupled to said motive means for starting said motive means and for varying its speed, to control the volume of air mixture supplied to said space;
    controller means for causing said modulator means and said damper means to cooperate in a functionally related manner relative to the velocity of the primary air available for cooling the air in the space and a user selected predetermined air temperature for the air in the space; and
    means coupled to said controller for sensing the velocity of said primary air available for cooling the air in the space and the temperature of the air in the space.

2. A system according to claim 1, wherein the interior of said terminal means is in atmospheric communication with heat processing means to permit the air mixture flowing from the interior of said terminal means to be heated to a predetermined temperature to control the temperature of the air in the space to approximate a user selected predetermined heating temperature.

3. A system according to claim 2, wherein said controller means further causes said heating means to cooperate with said modulator means and said damper means for raising the temperature of the air in the space to a user selected predetermined heating temperature.

4. A system according to claim 3, wherein said controller stores signals indicative of an algorithm for causing said modulator means and said damper means to cooperate in a functionally related manner, said functionally related manner including a plurality of setpoint states for determining the speed of said motive means to control the volume of air mixture supplied to said space.

5. A system according to claim 4, wherein said setpoint states include a heating setpoint indicative of a selected air heating temperature for the air in the space; a cooling setpoint indicative of a selected air cooling temperature for the air in the space; and a deadband setpoint indicative of a minimum ventilating requirement for the air in the space.

6. A system according to claim 4, wherein said sensing means includes signal means for generating a set of signals indicative of said heating setpoint, said deadband setpoint and said cooling setpoint.

7. A system according to claim 6, wherein said controller means responds to said algorithm signals for causing the speed of said motive means to vary proportionally relative to the velocity of said primary cooling air entering said chamber.

8. An air conditioning system according to claim 6 whereas said controller means responds to said algorithm signals for causing the speed of said motive means to vary according to the following formula whenever there is a heating demand:

FAN OUTPUT=HTG DEMAND−THG VOL. SETPOINT−DEADBAND VOL./100+DEADBAND VOLUME SETPOINT.

9. A system according to claim 6, wherein said controller means responds to said algorithm signals for causing the speed of said motive means to vary according to the following formula wherever there is a cooling demand:

FAN OUTPUT VOLUME = COOLING DEMAND*

COOLING VOLUME SETPOINT − $\frac{\text{DEADBAND VOLUME}}{100}$ +

DEADBAND VOLUME SETPOINT.

10. A method of operating a variable air volume ventilating system, for a space, comprising:
supplying a given volume of air mixture to a space to condition the air therein to an approximate predetermined temperature;
permitting a desired quantity of primary air to be mingled with a certain quantity of return air from said space to form an air mixture for conditioning the air in said space;
using damper means for supplying a desired quantity of primary air to the interior of said terminal means;
drawing said desired quantity of primary air into the interior of said terminal means and discharging a given volume of air mixture from said interior into said space;
drawing said certain quantity of return air into the interior of said terminal for facilitating the mingling of said return air with said desired quantity of primary air;
using modulator means for starting motive means and for varying the speed of said motive means;
varying the speed of said motive means to control the volume of air mixture supplied to said space;
causing said modulator means and said damper means to cooperate in a functionally related manner relative to the velocity of the primary air available for cooling the air in the space and a user selected predetermined air temperature for the air in the space; and
monitoring the velocity of said primary air available for cooling the air in the space and the temperature of the air in the space.

11. A variable air volume ventilating system for supplying air to a space, comprising:
means for supplying primary air;
means for supplying return air;
series fan means for discharging a mixture of primary air and return air into the space; and
sensing means for detecting the temperature of the air within the space;
modulating means responsive to said sensing means for varying the speed of said fan means as the temperature of the air within the space increases, the speed of said fan means being set to enable the output volume of said fan means to exceed the volume of available primary air.

12. A variable air volume ventilating system for supplying air to a space according to claim 11 further comprising:
heat producing means for heating the air entering the space to a predetermined temperature to control the temperature of the air in the space to approximate a user selected predetermined temperature; and
damper means for supplying a desired quantity of primary air to said series fan means.

13. A variable volume ventilating system according to claim 12 wherein said modulating means causes said heating means and said damper means to cooperate for controlling the temperature of the air in the space to a user selected predetermined temperature.

14. A variable volume ventilating system according to claim 13 wherein said modulating means stores signals indicative of an algorithm for causing said heating means and said damper means to cooperate in a functionally related manner, said functionally related manner including a plurality of setpoint states for determining the speed of said series fans means to control the volume of air supplied to said space.

15. A variable volume ventilating system according to claim 14 wherein said setpoint states include a heating setpoint indicative of a selected air heating temperature for the air in the space; a cooling setpoint indicative of a selected air cooling temperature for the air in the space; and a deadband setpoint indicative of a minimum ventilating requirement for the air in the space.

16. A variable volume ventilating system according to claim 11 wherein said modulating means includes means for sensing the velocity of said primary air available for cooling the air in the space and the temperature of the air in the space.

17. A variable air volume ventilating system according to claim 16 wherein said means for sensing includes signal means for generating a set of signals indicative of said heating setpoint, said deadband setpoint, and said cooling setpoint.

18. A variable volume ventilating system according to claim 17 wherein said modulating means responds to said algorithm signals for causing the speed of said fan means to vary proportionally relative to the velocity of said available primary air.

19. A variable volume ventilating system according to claim 18 wherein said modulating means responds to said algorithm signals for causing the speed of said fan means to vary according to the following formula whenever there is a heating demand:

FAN OUTPUT VOLUME=HEATING DEMAND−HEATING VOLUME SETPOINT−DEADBAND VOLUME/100+DEADBAND VOLUME SETPOINT.

20. A variable volume ventilating system according to claim 19 wherein said modulating means responds to said algorithm signals for causing the speed of said fan means to vary according to the following formula wherever there is a cooling demand:

FAN OUTPUT VOLUME = COOLING DEMAND*

$$\frac{\text{COOLING VOLUME SETPOINT} - \text{DEADBAND VOLUME}}{100} +$$

DEADBAND VOLUME SETPOINT.

21. A system according to claim 11, comprising:
said modulating means for varying the speed of a fan between a maximum output rate and a minimum output rate;
sensor means for setting a desired air temperature in the space;
means for sending information between said sensor means and said modulating means to cause said fan speed to be varied for adjusting the temperature of the air in the space to approximate a user selected desired temperature; and
means coupled to said sensor means for setting minimum and maximum air flow rates for said fan means.

22. A system according to claim 11, wherein the minimum output rate of said fan means exceeds the flow rate of said cool primary air.

23. A method of operating a variable volume ventilating system comprising the steps of:
using fan means in series with a supply of available primary air for discharging air into a space;
discharging primary air and return air into said space;
varying the speed of said fan means as the temperature of the air within the space increases; and
maintaining the speed of said fan means at a sufficient speed to enable to output volume of said fan means to exceed the volume of available primary air.

24. A method of operating a variable volume ventilating system according to claim 23 further comprising the steps of:
sensing the velocity of said available primary air for cooling the air in the space and the temperature of the air in the space;
using damper means for controlling the volume of available primary air supplied to said fan means;
using heating means to adjust the temperature of the air entering the space to a predetermined temperature;
generating a set of signals indicative of a heating setpoint, a deadband setpoint and a cooling setpoint where said heating setpoint is indicative of a selected air heating temperature for the air in the space, where said deadband setpoint is indicative of a minimum ventilating requirement for the air in the space, and where said cooling setpoint is indicative of a selected cooling temperature for the air in the space; and
storing signals indicative of an algorithm for causing said heating means, said fan means and said damper means to cooperate in a functionally related manner relative to the velocity of the primary air available for cooling the air in the space and a user selected predetermined temperature for the air in the space.

25. A method of operating a variable volume ventilating system according to claim 24 further including the steps of:
responding to said signals indicative of an algorithm to cause said heating means to cooperate with said fan means and said damper means for raising the temperature of the air in the space to a user selected predetermined heated temperature.

26. A method of operating a variable volume ventilating system according to claim 24 further including the steps of:
responding to said signals indicating of an algorithm to cause said damper means to cooperate with said fan means and said heating means for lowering the temperature of the air in the space to a user selected predetermined cooling temperature.

27. A method of operating a variable volume ventilating system according to claim 24 further comprising the steps of:
responding to said signals indicative of an algorithm for causing the speed of said fan means to vary according to the following formula whenever there is a heating demand:

FAN OUTPUT VOLUME=HEATING DEMAND−HEATING VOLUME SETPOINT−DEADBAND VOLUME/100+DEADBAND VOLUME SETPOINT.

28. A method of operating a variable volume ventilating system according to claim 24 further comprising the steps of:
responding to said signals indicative of an algorithm for causing the speed of said fan means to vary according to the following formula wherever there is a cooling demand:

FAN OUTPUT VOLUME = COOLING DEMAND*

$$\frac{\text{COOLING VOLUME SETPOINT} - \text{DEADBAND VOLUME}}{100} +$$

DEADBAND VOLUME SETPOINT.

* * * * *